SHEET-LIKE STORAGE MEDIUM

Filed Aug. 24, 1966

INVENTOR.
JOSEPH A. WIESE, JR
WILLIAM B. BARTE
BY
Carpenter, Kinney & Coulter
ATTORNEYS United States Patent Office 3,526,542
Patented Sept. 1, 1970

3,526,542

SHEET-LIKE STORAGE MEDIUM

Joseph A. Wiese, Jr., and William B. Barte, St. Paul, Minn., assignors to Minnesota Mining and Manufacturing Company, St. Paul, Minn., a corporation of Delaware Filed Aug. 24, 1966, Ser. No. 574,791
Int. Cl. H01f *10/02, 10/06*
U.S. Cl. 117—216 10 Claims

ABSTRACT OF THE DISCLOSURE

A sheet-like storage medium having an imaging layer comprising a homogeneous mixture of a halogen-containing binder and alpha ferric oxide.

Figure 1:
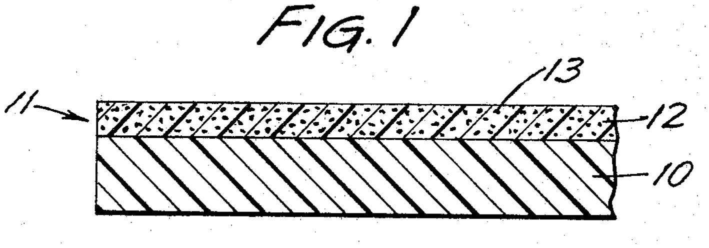

This invention relates to new processes for storing and retrieving information using various forms of electromagnetic radiation, and to compositions and media useful therefor.

In one embodiment this invention is directed to a class of self-supporting sheet-like media preferably sensitive to radiation having wavelengths below about one micron and useful for storing information which contain alpha ferric oxide dispersed in a substantially moisture vapor impermeable halogen-containing binder.

In another embodiment this invention relates to processes for storing information in media containing ferric-oxide in a halogen-containing binder, using a controlled beam of high electromagetic energy such as an electron beam, a proton beam, an ion beam, an infrared beam, a laser beam, and the like.

In still another embodiment, this invention relates to processes for retrieving information from media of the class indicated using more than one form of instrumentally detectable physical property such as photon energy transmission, absorption, and/or emission, magnetic susceptibility, secondary electron emission ratio, and the like.

It has long been appreciated that the capacity to record and reproduce information in a given medium using a plurality of different portions of the electromagnetic spectrum is advantageous because of associated conveniences in storage density, monitoring, editing, registration and medium positioning, compatibility with a variety of communications or graphic systems, etc. Although the art has heretofore known how to record (store) in and to reproduce (retrieve or read out) information from, a medium by a variety of different techniques, so far as is known to use, such prior art processes and media have usually depended upon a single form of energy for recording and upon the same or other form of energy for readout. For example, readout heretofore has been accomplished by the generation of a signal having a characteristic energy associated with a particular portion or bandwidth of the electromagnetic energy spectrum. By the present invention, however, there are provided media and methods whereby one can store and/or retrieve information using not merely one, but a plurality of different forms of instrumentally detectable energy either sequentially or simultaneously.

It is accordingly an object of the present invention to provide an information storage and retrieval system capable of using, sequentially or simultaneously, at least one controlled beam of high energy, e.g., a modulated electron beam for recording and readout, and capable of using more than one form of energy for readout.

Another object of this invention is to provide a process for storing and retrieving information using as a storage medium a sheet-like construction having uniformly incorporated therein ferric oxide preferably dispersed in a halogen-containing binder, a particularly preferred binder being a copolymer of vinylchloride and vinylacetate.

Another object of this invention is to provide a new sheet-like information storage medium and novel associated retrieval process.

Another object of this invention is to provide a composition useful in the aforeindicated media, such composition employing a mixture of substantially moisture vapor impermeable halogen-containing binder and alpha ferric oxide.

Other and further objects of this invention will become apparent to those skilled in the art from a reading of the present specification taken together with the drawings.

In accordance with the above and other objects of the invention, there has been provided a composition containing a binder which includes halogen-containing ferric oxide and which can be employed to prepare recording or storage media which when exposed to controlled high-energy beam form image-like areas corresponding to information to be stored and retrieved, which are capable of being read out in several ways.

These compositions and media form the basis for an information storage and retrieval system in which simultaneous and/or sequential storage and readout can be accomplished, using the same or different energy sources for these purposes.

Recording of information is achieved by selectively creating in the medium during impingement of such a high-energy beam thereupon an image-like pattern which corresponds to the information being recorded. The pattern differs from the adjacent background area as respects its secondary electron emission ratio, magnetic susceptibility, electrical conductivity, optical properties, and, possibly, other physical properties.

Figure 2:
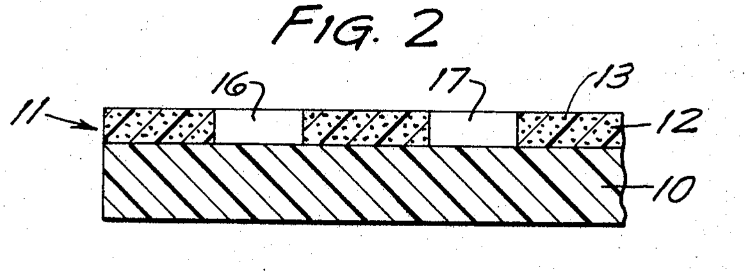
Figure 3:
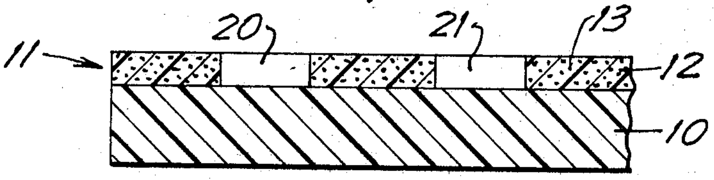

In the drawings:

FIG. 1 diagrams one form of medium construction useful in practicing the process of this invention before the same is used for storing information;

FIG. 2 is a view similar to FIG. 1, but showing one appearance of such medium construction after the same has been used for storing information; and FIG. 3 is a view similar to FIG. 2, but showing diagrammatically the appearance of such medium construction after the same has been subjected to heat intensification.

MEDIA AND METHODS FOR MAKING

In general, storage media useful in the present invention are conveniently sheet-like and contain incorporated therein ferric oxide, although drum or disc shapes may be equally useful.

As used in this application, the terms "ferric oxide," "ferric oxides," and equivalents have reference, unless otherwise indicated, to both alpha ferric oxide and gamma ferric oxide.

As those skilled in the art will appreciate, alpha ferric oxide is the hexagonal crystal form, having a structural formula $Fe_2O_3$. It is reddish in color, and is generally credited as being non-magnetic, more recent evidence, however, indicating it to be weakly ferrimagnetic.

Similarly, as those skilled in the art will appreciate, gamma ferric oxide is the strongly magnetic tetragonal or nearly cubic crystal form having a structural formula $Fe_2O_3$. Normally, it is brown to tan in color.

By the term "magnetic" reference is had to both ferromagnetic properties (e.g., as those of iron, magnetite ($Fe_3O_4$) and gamma ferric oxide) and ferrimagnetic properties (e.g., as those of alpha ferric oxide and certain of the ferrites) as distinguished from paramagnetic and diamagnetic properties which are referred to by the term "non-magnetic."

Ferric oxide in a medium construction of this invention becomes selectively more strongly magnetic upon exposure to a source of differential electromagnetic radiation preferably having wavelengths below about one micron and having an associated energy sufficient to initiate localized conversion of media material as by creation of a selectively more magnetic substance. In the practice of this invention it is only necessary that an instrumentally detectable selective change in magnetic or other property occurs in the ferric oxide of a medium exposed to differential electromagnetic radiation. Such a change in magnetic properties may not be instrumentally detectable until after a medium has been subjected to heating (i.e., heat development) as hereinafter detailed. However, after exposure to such a source, and after such heat development, the places in such exposed medium construction where an instrumentally detectable selective magnetic change appear can also characteristically be detected by means of secondary electron emission.

Instrumental detection means are known to the art and form no part of this invention. Such means as spectrophotometers, photomultipliers, Faraday balance (for magnetic permeability), collector rings (for secondary electron emission) and the like can be used.

In general, the particle size of ferric oxides useful in storage media of this invention can range from about 0.1 to 10$\mu$ (microns) though larger or smaller sizes can be used. A preferred particle size distribution ranges from about 0.5 to 5$\mu$.

Alpha ferric oxide, though initially very weakly magnetic, becomes selectively more magnetic when used according to the teachings of the present invention. It is much preferred in practicing this invention to employ media containing for its ferric oxide component at least 50 weight percent of alpha ferric oxide and most preferably substantially only alpha ferric oxide because alpha ferric oxide is initially very weakly magnetic and only becomes selectively more magnetic (presumably caused by a change in the chemical composition) when struck by a high-energy beam during a recording operation in accordance with the teachings of this invention. In spite of the strongly magnetic character of gamma ferric oxide, it is possible to practice the present invention using media containing such oxide so long as a detectable or retrievable change is produced in such media as a result of a recording operation.

For purposes of this invention, ferric oxide is mixed with halogen-containing binders when making storage media. Such binders are preferably substantially moisture vapor impermeable when the medium will be exposed to moist conditions in high humidity. The composition comprising ferric oxide and halogen-containing binder is then incorporated as by coating or the like, into a medium construction so as either to form a discrete layer therein, or to be more or less uniformly distributed therethrough.

Independently of position or exact composition, the combination of ferric oxide and halogen-containing binder in a medium construction is termed the "imaging layer." All media of this invention contain such an imaging layer.

By the term "halogen-containing binder" reference is had to a cohesive non-fluid composition capable of having dispersed therein ferric oxide. It is believed that such binders release atomic halogen under electromagnetic radiation preferably having wavelengths below about 1 micron (1$\mu$). Such cohesive composition can itself be composed of more than one chemical entity. Thus, for example, a halogen-containing binder may contain materials to produce a composition adapted to disperse the ferric oxide and bind the composite imaging layer to a substrate or other layer. The term "halogen" has reference to chlorine, bromine, and iodine, and mixtures thereof, though chlorine and bromine are preferred, from about 20 to 80 weight percent of chlorine or the molar equivalent of bromine and/or iodine being used.

The halogen-containing binder should have low volatility when a medium construction which is to be used in a vacuum environment (as for electron beam operation) is being prepared.

While any convenient substantially moisture vapor impermeable halogen-containing binder composition can be used, it is very much preferred for purposes of this invention to employ those which are highly halogenated polymers and which release atomic halogen upon exposure to electromagnetic radiation. Such polymers should be normally solid and of sufficiently high molecular weight to prevent their volatilization (i.e., above 1000 and preferably above 10,000 in average molecular weight). Such a polymer preferably is film forming, and contains in addition to hydrogen and carbon, from about 25 to about 73 weight percent of chlorine, or the molar equivalent amount of bromine, or mixtures thereof.

Especially for ease of coating a substrate, such polymers desirably are soluble in conventional organic solvents, such as tetrahydrofuran, acetone, 2-butanone, chloroform, dichloromethane, toluene, etc., although other solvent systems can be used for the more difficultly soluble polymers, such as polymers and copolymers of vinylidene chloride. Vinylidene chloride copolymers with such monomers as the aliphatic acrylates (e.g., n-butyl acrylate, methyl acrylate, ethyl acrylate, hexyl acrylate, methyl methacrylate, beta-chloroethyl acrylate, etc.), acrylonitrile, vinyl chloride, vinyl acetate, vinyl butyrate, etc., which are conveniently available, are preferred highly halogenated polymers.

One especially preferred halogen-containing binder is a copolymer made from 87 weight percent vinyl chloride and 13 weight percent vinyl acetate and available commercially from the Bakelite Corporation under the trade designation VYHH.

Ethylenically unsaturated monomers with a high halogen content such as 1,1,3,3,3-pentachloropropene-1, fluorotrichloroethylene, 1,1-difluoro-2,2 - dichlorethylene trichloroethylene, etc. copolymerized with vinyl or vinylidene chloride or bromide or with the aliphatic acrylates can also be employed. Halogenated aromatic polymers tend to be considerably less preferred than the halogenated aliphatic polymers. With the preferred vinylidene chloride polymers the chlorine concentration ranges from about 25 to 73 percent, preferably from about 40 to 70 percent by weight. With the vinyl chloride polymers the chlorine concentration ranges from about 35 to 55 percent, preferably from about 40 to 50 percent by weight of the polymer. Although the halogenated polymers are desirably deposited from solution as a film on a substrate, they may also be deposited from liquid dispersion as by spraying. With those polymers which tend to decompose slowly in the presence of ordinary light and atmospheric oxygen, antioxidants and other stabilizers may be added to improve good storage life.

Instead of using highly halogenated polymer systems as the halogen-containing binder, a combination of halogen free or low halogen content binder compositions with halogen-containing compounds which release atomic halogen when exposed to electro-magnetic radiation can be used. Such compounds may be represented by the generalized formula:

(1) $ACX_3$ where A is a monovalent radical selected from the group consisting of hydrogen, chlorine, bromine, iodine, alkyl and aryl; each X is selected from the group consisting of chlorine, bromine and iodine; and C, as usual, designates carbon.

Carbon tetrabromide, bromoform, or chloroform and other highly halogenated lower alkanes are members of this class as are $CCl_4$, $C_2Br_6$, $C_2Cl_6$, $C_2HBr_5$, and $C_6H_5CBr_3$.

A halogen containing compound of Formula 1 is conveniently used by admixing same with ferric oxide in a solution of a binder, such as nitro cellulose, and coating upon an appropriate substrate or base layer (see below). Other suitable binder materials for use with Formula 1 compounds include such synthetic polymers as polyvinyl chloride; a vinyl chloride or acrylonitrile copolymer with vinylidene chloride; cellulose derivatives, such as ethyl cellulose, methyl cellulose, and the like. A host of other suitable binder materials will readily suggest themselves to those skilled in the art.

Especially when a relatively thin imaging layer is employed in a medium construction, it is convenient to employ in such construction a backing layer of pre-formed or separately formed material. Such a backing layer can be organic or inorganic. Examples of suitable, commonly available organic backing layers include films, non-woven and woven structures formed of such materials as methyl polyvinyl chloride and copolymers thereof, cellulose, sisal, paper and the like.

Examples of suitable commonly available inorganic backing layers include metal in, for instance, the form of foils (such as those of aluminum, copper, gold, foil paper laminates, or the like), and ceramic materials.

In certain types of recording and retrieving operations within the scope of this invention, it is desirable to have associated with a recording medium, in addition to an imaging layer an electrically conductive layer. Such an electrically conductive layer serves to dissipate an electrical charge buildup, such as can occur during recording or readout with an electron beam, whereby a higher fidelity recording is typically obtained. Suitable electrically-conductive layers can be obtained, for example, by vacuum vapor deposition of thin metal films such as aluminum or copper over a backing member or by coating a conductive particulate material (such as carbon black, metal particles or the like in a polymeric binder) onto a backing layer.

Although it is preferred to have a conductive layer adjacent to an imaging layer, it will be appreciated that it may be convenient to have the imaging layer on one face of a backing layer and the conductive layer on the opposed face of such backing layer.

In certain types of recording medium constructions, it is sometimes desirable to include a fluorescent material or even a photoconductive material therein as in layered form particularly when fluorescent readout is contemplated.

In general, there appears to be no criticality in the arrangement of layers in a medium construction for practicing the teachings of the present invention. It will be appreciated that an electrically conductive material can be formulated with a backing material and that it is even possible to formulate homogeneous media wherein the halogen-containing binder, the ferric oxide and electrically conductive material (if one is used) are uniformly distributed throughout as a single layered homogeneous self-supporting construction. It will also be appreciated by those skilled in the art that some medium constructions are more preferred than others for reasons of processing, manufacture, ease in use, and the like.

As indicated above, media useful in practicing the present invention are usually prepared in a sheet-like form so as to permit ready handling, storage, etc.

In general, in practicing the present invention, it has been found to be preferable to use as recording media those wherein there is a discrete, separate imaging layer; such layer is preferably as thin as practicable, considering the particular recording and reproducing operations for which a given medium construction is to be utilized.

In imaging layers, it is generally convenient to employ a weight ratio of halogen-containing binder to ferric oxide of from about 1:1 to 1:15. A more preferred ratio has been found to be about one part binder to two parts of ferric oxide, especially when one employs as the halogen-containing binder a vinyl chloride/vinyl acetate copolymer such as VYHH (above described) and ferric oxide having a crystallite size range of from about 0.1 to 1.5 $\mu$. (1 $\mu$ is equal to $10^{-4}$ cm.)

When using a backing layer, it is generally convenient to simply coat thereon the imaging layer in the form of a non-aqueous slurry (or mixture) by conventional coating techniques and thereafter to dry and store for use. In general, conventional casting and coating procedures can be used to prepare medium constructions.

RECORDING (INFORMATION STORAGE)

Briefly, to record information in accordance with the teachings of this invention using a medium as above described, one impinges a controlled beam of energy preferably of high energy and preferably having a wavelength less than one micron against one surface of such a medium.

Beam(s) having wavelengths less than 1 micron are preferably employed in the practice of this invention because such wavelengths do not include infrared energy. Random application of heat energy to a medium construction during and before recording is preferably avoided.

It will be appreciated that in order to store information using a high-energy beam, it is necessary in some manner to control (i.e., modulate and scan, etc.) the particular beam being used to record so as to have the capacity to differentially or selectively irradiate a surface of the storage medium so as to effect information recordation. Modulation of a beam with information to be stored can be effected by any conventional process whereby some characteristic of such a beam is varied in such a manner or to such a degree that the resulting variations or differences in beam energy or intensity as it strikes a medium being recorded upon produce selective image-like alterations in such medium.

For example, electron beams, proton beams, photon beams, ion beams, infrared beams, and laser beams can all be intensity modulated by means well known to those of ordinary skill in the art. Since the generation and control of beams of high energy is accomplished by apparatus and methods which do not form a part of the present invention and which are well known to those of ordinary skill in the art, no detailed explanation thereof is given herein. The particular type of high-energy beam employed in any given instance depends, of course, upon the sensitivity and response associated with a given recording medium, upon the recording conditions, and upon a number of other variables.

It will be appreciated that, in some types of recording, it is necessary or desirable to position a recording medium in a special location or apparatus. For example, when one records upon a medium construction using an intensity modulated, scanning electron beam, it is usually convenient to place both electron gun and medium in a vacuum chamber wherein, typically, low pressures of the order of about $10^{-3}$ to $10^{-6}$ mm. Hg pressure are conventionally employed, as those familiar with electron beam techniques will readily appreciate, but pressures greater or smaller than those indicated can be used. In general, the technology for producing controlled beams of high energy is well known.

Obviously, the type of information which can be stored can vary widely and includes, among others, video signals as well as telemetry data. In general, the processes of this invention are not limited by the nature of the information to be stored.

The exposure of a medium to variations in beam energy creates therein a generally latent image-like pattern of material which differs in secondary electron emission ratio from the surrounding background areas, such image-like pattern being a systematic characterization of the information to be recorded. Readout by secondary electron emission ratio sometimes is possible without heat development. Generally for other types of readout, heat development is required.

HEAT INTENSIFICATION OF BEAM GENERATED PATTERN

Either concurrently with, or following exposure of a medium to a controlled beam of intense electromagnetic energy in a recording operation, it is preferred to subject such medium to uniform heating. Such heating, for reasons not altogether clear, generally and usually results in an intensification of the generally latent image-like pattern created by the incident controlled beam of energy.

Depending upon the nature of the medium being used, the nature of the controlled beam of energy and related factors, a generally latent image-like pattern created by a beam in a medium may or may not be substantially invisible and undetectable by such means as, for example, by visible light, or by magnetic susceptibility. In general, the greater the sensitivity of the medium being used (as respects its ability to respond to the particular beam of energy being employed for recording), and the greater the energy of such recording beam, the greater the likelihood of producing directly by beam exposure an image-like pattern which is visually detectable or by magnetic susceptibility.

If a visible or otherwise detectably image-like pattern is directly created during recordation, then no further treatment of the medium may be necessary or desirable before a readout operation (described hereinafter) is undertaken. However, it has been found desirable and in some instances actually necessary in order to make an instrumentally detectable change in some physical property such as photon energy transmission, absorption and/or emission, magnetic susceptibility, or even secondary electron emission ratio, to subject a prerecorded medium to heat intensification, as by exposure to a uniform zone of thermal energy. Such intensification as a result of heating can usually be observed by mere visual inspection using a source of polychromatic light.

The temperature and duration of heating can vary. In general, lower heating temperatures require longer heating times, and vice versa, in order to develop or intensify an image pattern. Heating temperatures and times are dependent upon the degree of image pattern intensification desired or necessary.

Because of the variables involved, it is not practicable to give a single time-temperature relationship suitable for all media and beam recording conditions. However, usually temperatures below 300° C. are employed and heating times are generally less than 4 minutes. Commonly, temperatures in the range of from about 90 to 150° C. for times of less than about one minute are suitable. Because in a given ferric oxide-containing medium there appears generally to be a high correlation between a visible color change associated with information recording and the correlated changes in magnetic and secondary electron emission properties, it is a convenient rule of thumb to heat such a medium for a time sufficient to develop a visible color change image in irradiated or controlled beam-struck areas in order to magnify changes in magnetic properties and secondary electron emission properties. Heat developed image areas in a recorded medium are typically darker in color than background areas.

In general, it is preferred that, as respects a given medium and a given controlled beam of electromagnetic energy, the combination of recording and heat intensification (if the latter is used be sufficient to produce an instrumentally detectable image-like pattern in such medium. Detectability, of course, will vary depending upon such things as equipment limitations, fidelity, sensitivity, etc. In any case, a medium construction capable of exhibiting a signal to noise ratio of 5:1 or greater is preferred when reading out (see below).

INFORMATION RETRIEVAL

Briefly, retrieval from a beam exposed, and heat intensified (if necessary or desirable) prerecorded medium, as just described, is accomplished by exposing such a medium to at least one uniform field of electromagnetic energy and simultaneously detecting changes in such electromagnetic energy field created by such prerecorded medium. These energy changes can typically be in the form of photon energy (e.g., reflected, absorbed or emitted), magnetic susceptibility variations, differential secondary electron emission ratio changes, or some combination thereof. Such processes of readout are known and the conventional methods are employed in the system of this invention.

FIGURE DESCRIPTION

Turning to the drawings, there is seen in FIG. 1 one embodiment of a medium construction of the invention. A substrate or backing layer 10 is coated on one face thereof with a relatively thin (preferably below about 3 mils) imaging layer 11. The imaging layer 11 is composed of a continuous halogen-containing binder composition 12 having uniformly distributed therethrough ferric oxide 13.

In FIG. 2 the medium construction of FIG. 1 has been subjected to sufficient electromagnetic energy to form therein latent image areas 16 and 17. These areas or patterns can be considered to have been formed by two successive scans of an unmodulated electron beam traveling normally to the direction of the section shown.

In FIG. 3, the latent image shown in FIG. 2 has been subjected to uniform heating so as to intensify the latent images 16 and 17 of FIG. 2. The heat intensified image, herein designated by the respective numerals 20 and 21, are a different color to the eye than the adjacent background areas of the layer 11. This image may also be produced by direct exposure without heat development, in media constructions having appropriate sensitivity. The areas 20 and 21 also display a different coercivity and different secondary electron emission properties from the background area.

Typical values for the scanning electron beam for secondary electron emission readout range from about 1 to 12 kilovolts with about 2 microamperes beam current, and a focused beam spot diameter on the target typically of about 25 microns. Scanning times for a raster are typically those of commercial television.

The chemical composition of the patterned areas in a prerecorded medium is not definitely known, but it is theorized (and there is no intent or desire herein to be bound by the theory) that the patterned areas are at least partially magnetite ($Fe_3O_4$). Thus, by such theory, it is supposed that a beam of high energy converts the alpha ferric oxide or the gamma ferric oxide to magnetite, possibly through catalytic action of adsorbed or residual matter. This theory is somewhat supported by available data since, as nearly as can be measured, the coercive force of the patterned areas corresponds to that of magnetite. An over-all comparison is presented by the following Table I:

TABLE I.—IRON OXIDE PROPERTIES

| Iron oxide | Coercive force [1] (oersteds) | Magnetization (electromagnetic units/gm.) | Color | Electrical resistivity, (ohm-cm.) | Crystal structure |
|---|---|---|---|---|---|
| Alpha ferric oxide ($\alpha$-$Fe_2O_3$). | 500–700 | <0.5 | Reddish | $>10^{-6}$ | Hexagonal. |
| Gamma ferric oxide ($\gamma$-$Fe_2O_3$). | 225–300 | ~75 | Brown to tan | $>10^{-6}$ | Tetragonal. |
| Magnetite ($Fe_3O_4$) | 275–400 | ~90 | Black | $\sim10^{-2}$ | Cubic spinel. |

[1] Depends upon particle size and uniformity and, in Table I, these values are characteristic of needle-like crystal structures having a particle size of the order of about 1 micron in maximum average dimension.

EXAMPLES 1 THROUGH 18

Alpha $Fe_2O_3$ and gamma $Fe_2O_3$ are each formulated into respective media suitable for electron beam recording in accordance with this invention as follows:

In each instance a mixture is prepared having the following proportions:

(1) 1 gram iron oxide compound;
(2) 5 grams binder (e.g., Bakelite brand VYHH, a copolymer 87% vinylchloride and 13% vinylacetate);
(3) 100–120 ball cones of stainless steel grinding media (e.g., 3/16" ball cones available from Abbott Ball Company, Hartford, Conn.) per each part by weight of iron oxide compound; and
(4) 25–50 grams of dichloromethane (as a binder solvent and dispersing medium).

The resulting mixture is tumbled for four hours in a glass-lined container to produce a dispersion suitable for coating. Such dispersion is then knife coated upon an aluminum foil-paper laminate. This laminate comprises an aluminum foil about 1 mil thick bonded to a paper backing averaging two mils thick. The resulting aluminum foil-paper laminate in all instances is transversely electrically resistive to the extent of about 1,000 ohms per square. The coating of such laminate with such dispersion is accomplished by passing the aluminum or obverse side of the paper over a knife coating apparatus in such a manner that a coating is deposited on the aluminum side of the laminate while such laminate is in a vertical position. Immediately on coating, the aluminum coated side is moved so that such coated side is dried facing downwards. By so coating, the gravitational field tends to bring the iron oxide compound near the surface of the coating, a condition which is desirable for electron beam recording owing to the relatively low penetrating power of electron beams of moderate energy. The coating thickness of the web coated dispersion is such that after drying in air the dry film thickness is about 0.1 mil. The final particle size of the iron oxide compound in the medium is dependent on the initial iron oxide compound particle size and on the conditions of grinding. Apparently, a fine particle size of ferric oxide compound (0.1 to 1.5 microns average diameter) gives films yielding best image quality.

Table II below summarizes media so prepared as described above.

Then using a suitable electron beam recording (EBR) apparatus information is recorded upon each medium made as above described in the following manner:

Each medium is placed in the vacuum chamber with an electron beam generating apparatus wherein the pressure is maintained below about $10^{-3}$ torr. An electron beam is employed which has a circular cross-sectional diameter of about 25 microns in the target region where the medium being recorded upon is located. The beam has an accelerating potential of about 30 kilovolts and an average target current of about 200 microamperes. The exposure of each medium is controlled by recording apparatus capable of generating commercial television frames (i.e. two interlaced fields, the duration of a single field generation being 0.0167 sec.).

A sample of each medium is exposed by scanning a given fixed area with a given arbitrary number of TV frames. After such exposure, each sample is removed from the vacuum chamber and subjected to uniform heating in air to about 150–250° C. until a substantially visible image appears in an exposed area (usually in approximately less than 4 minutes).

If a substantially visible image appears, then another sample of such medium is exposed, but this time to a smaller number of TV frames. The resulting sample is developed as before. This procedure is repeated using a successively smaller number of TV frames for exposure before development until substantially no visible image appears upon development. Such a minimum number of TV frames scanned is recorded for each medium example in Table II below in the column entitled "Retrieval Evaluation."

If, on the other hand, the initial number of TV frames used for first exposure of a medium sample is insufficient to produce a substantially visible image on development, then this procedure is repeated using a successively larger number of TV frames for exposure before development until a substantially visible image results upon development, or until it reasonably appears that no such image can be produced with the medium involved under the conditions of recording employed. If a substantially visible image does appear, then, as explained above, such minimum number of TV frames scanned is recorded for each medium example in Table II below in the column entitled "Retrieval Evaluation."

Table II below summarizes data on media constructions, electron beam recording conditions on such media, and retrieval evaluation of the resulting recorded media. It will be appreciated that while in each instance such evaluation is accomplished visually it can also be accomplished with generally equivalent results using secondary electron emission ratio and/or magnetic susceptibility ratio readout.

TABLE II

| | Energy sensitive composition | | | | | Electron beam recording | | Retrieval evaluation—exposure: |
|---|---|---|---|---|---|---|---|---|
| Ex. No. | Form of $Fe_2O_3$ used | Binder | $Fe_2O_3$: Binder ratio | Solvent | Substrate | Accelerating potential (kv.) | Beam current ($\mu$a.) [6] | Number of TV frames scanned before a visible image is formed [5] |
| 1 | Gamma | VYHH [1] | 3:1 | Dichloromethane | Polyethylene terephthalate. | 20 | 40 | 3,000 |
| 2 | do | VYHH | 3:1 | do | do | 20 | 40 | 150 |
| 3 | do | VYHH | 3:1 | do | Aluminum paper | 20 | 40 | 15 |
| 4 | Alpha | VYHH | 3:1 | do | do | 20 | 40 | 150 |
| 5 | do | Pliolite S-7 [2] | 3:1 | Toluene | do | | | [4] No image. |

Footnotes at end of table.

TABLE II—Continued

| Ex. No. | Form of $Fe_2O_3$ used | Binder | $Fe_2O_4$: Binder ratio | Solvent | Substrate | Electron beam recording: Accelerating potential (kv.) | Electron beam recording: Beam current (μa.)[6] | Retrieval evaluation—exposure: Number of TV frames scanned before a visible image is formed[5] |
|---|---|---|---|---|---|---|---|---|
| 6 | do | VYHH | 3:1 | do | Paper | 30 | 200 | 30 |
| 7 | do | VYHH | 3:1 | do | Polyethylene terephthalate. | 30 | 200 | 30 |
| 8 | do | VYHH | 3:1 | do | Aluminum foil | 30 | 200 | 7 |
| 9 | do | VYHH | 1:1 | 1:1 methylethylketone with toluene. | Aluminum paper | 30 | 200 | 7 |
| 10 | do | VYHH | 2:1 | do | do | 30 | 200 | 1 |
| 11 | do | VYHH | 3:1 | do | do | 30 | 200 | 7 |
| 12 | do | VYHH | 4:1 | do | do | 30 | 200 | 15 |
| 13 | do | VYHH | 5:1 | do | do | 30 | 200 | 30 |
| 14 | do | VYHH | 6:1 | do | do | 30 | 200 | 45 |
| 15 | do | Methyl cellulose | 2:1 | $H_2O$ | do | 30 | 200 | [4] No image |
| 16 | do | Polymethylmethacrylate. | 2:1 | Toluene | do | 30 | 200 | [4] No image |
| 17 | do | Ethocel[3] | 2:1 | Methanol | do | 30 | 200 | [4] No image |
| 18 | do | VYHH | 2:1 | Methylene chloride | do | 30 | 200 | 1 |

[1] VYHH is a copolymer made from 87% polyvinyl chloride and 13% polyvinyl acetate which is made by the Bakelite Corp.
[2] Pliolite S-7 is styrene-butadiene and is available from Goodyear Tire and Rubber Co., Chemical Division.
[3] Ethocel is ethylcellulose and is available from the Dow Chemical Company.
[4] The absence of an image is corrected with the absence of halogen-containing binder in this medium example (irrespective of exposure time and heat development).
[5] After heat development.
[6] μa. Refers to microamperes.

EXAMPLES 19–28

To demonstrate the feasibility of using secondary electron emission ratio to readout prerecorded information using an alpha ferric oxide-containing medium of this invention, the following examples are given;

Two unexposed samples of media prepared as described in Example 10 (see Table II) are each successively positioned on the target area in the vacuum chamber (pressure below about $10^{-3}$ torr) of an electron beam generating apparatus. This apparatus is adapted to generate an unmodulated moderate energy electron beam deflected into a TV raster and is also equipped with a collector ring adapted to detect secondary electron emission generated in the target area during appropriate beam bombardment thereof. Each sample is large enough to accommodate a plurality of TV raster areas.

A portion of each such sample is exposed for a predetermined interval of time by an unmodulated moderate energy electron beam deflected into a TV raster. Successive sections of each sample are each sequentially exposed to a different one of a series of TV rasters, each raster having an incrementally increased beam current compared to its predecessor, each exposure in such series being for the same total time interval. Simultaneously with each such exposure, measurements are made of the target current, $I_t$, and the secondary electron emission current, $I_s$. Since the total current, $I_p$, is the sum of $I_t$ and $I_s$, the secondary electron emission ratio, $I_s/I_p$, can be and is determined, as recorded in Table III below. It will be appreciated that in each exposure the secondary electron emission ratio is determined from a summation of the average values occurring over the entire raster area.

At the conclusion of such a series of exposures, the medium sample is removed from the apparatus and inspected for any visible changes produced by such beam exposures. The observations indicate that for relatively low exposure levels, essentially no change (either visible or secondary electron emission ratio) in the recording media occurs, while at sufficiently intense exposure levels, there is a visible color change and a corresponding change in secondary electron emission ratio. Since there appears to be a high correlation between visible color change and secondary electron emission ratio change (both compared to unexposed medium) readout by secondary electron emission is thus permitted.

TABLE III

| Ex. No. | Raster total exposure time (sec.) | Target current on sample ($I_t$) | Secondary electron emission current ($I_s$) | Primary beam current ($I_p$) | Secondary electron emission ratio ($I_s/I_p$) | Visible color change in medium after exposure |
|---|---|---|---|---|---|---|
| 19 | 5 | 76 | 6 | 82 | .073 | Virtually no change. |
| 20 | 5 | 165 | 12 | 177 | .067 | Do. |
| 21 | 5 | 250 | 16 | 265 | .057 | Do. |
| 22 | 5 | 375 | 25 | 400 | .063 | Do |
| 23 | 5 | 500 | 80 | 580 | .138 | Dark brown. |
| 24 | 10 | 70 | 4 | 74 | .054 | No change. |
| 25 | 10 | 175 | 11 | 186 | .059 | Do. |
| 26 | 10 | 225 | 20 | 245 | .082 | Light brown. |
| 27 | 10 | 250 | 25 | 275 | .091 | Medium brown. |
| 28 | 10 | 500 | 75 | 575 | .131 | Dark brown. |

EXAMPLE 29

In a still further demonstration, a medium which has been prerecorded and heat developed as described in Example 10 is positioned in the target area of an electron beam generating apparatus equipped with a secondary emission current collector ring (as described in Examples 19–28), thus enabling the detection of secondary electrons generated in the target area during appropriate beam bombardment thereof. The prerecorded area is scanned as before, with a relatively low current, low energy, unmodulated beam, scanned TV raster. The beam current and energy used for readout are normally kept below the recording level threshold. Simultaneously as $I_s$ and $I_t$ are measured, $I_s$ is also fed through a coupling circuit to appropriate amplifiers and hence to a TV monitor. The secondary electron emission ratio, determined from a summation of the average values occurring over an entire raster area, is significantly greater from the raster formed over the imaged area than from a raster formed over a non-imaged area. When the raster is over the imaged area of the sample, a high quality sequentially reproduced image is observed on the monitor screen of the recorded graphic image of the sample.

The claims are:

1. A sheet-like self-supporting storage medium sensitive to radiation having wave lengths below about 1 micron containing laterally uniformly distributed therein relative to one face thereof a composition comprising a substantially moisture vapor impermeable halogen-containing binder which releases atomic halogen upon exposure to said radiation, said binder having dispersed therein alpha ferric oxide.

2. A sheet-like storage medium comprising:

(a) a backing layer of solid material stable to electromagnetic energy, and (b) an imaging layer supported by one face of said backing layer and comprising a homogeneous mixture of a binder and alpha ferric oxide, said binder being capable of liberating atomic halogen when bombarded by high electromagnetic energy.

3. The medium of claim 2 wherein the total thickness of the imaging layer averages less than about 3 mils.

4. A sheet-like storage medium having an imaging layer comprising a homogeneous mixture of a halogen-containing binder which releases atomic halogen upon exposure to electromagnetic radiation and alpha ferric oxide.

5. The medium of claim 4 wherein the weight ratio of said binder to said ferric oxide ranges from about 1:1 to 1:15.

6. The medium of claim 4 wherein said binder contains from about 25 to 73 weight percent of labile halogen selected from the group consisting of fluorine, chlorine, bromine and iodine.

7. The medium of claim 4 having a latent image representative of prerecorded information formed therein.

8. The medium of claim 4 having a visible image representative of prerecorded information formed therein.

9. The medium of claim 4 wherein the average thickness of said imaging layer is less than about three mils.

10. A sheet-like storage medium having an electrically conductive layer and having an imaging layer comprising a homogeneous mixture of a halogen-containing binder which releases atomic halogen upon exposure to electromagnetic radiation and alpha ferric oxide.

References Cited

UNITED STATES PATENTS

| | | | |
|---|---|---|---|
| 3,261,706 | 7/1966 | Nesh | 117—235 X |
| 3,274,111 | 9/1966 | Sada et al. | 117—237 X |
| 3,383,346 | 5/1968 | Smith | 260—41 X |

WILLIAM D. MARTIN, Primary Examiner

B. D. PIANALTO, Assistant Examiner

U.S. Cl. X.R.

117—235, 217, 239, 226, 227

UNITED STATES PATENT OFFICE
CERTIFICATE OF CORRECTION

Patent No. 3,526,542 Dated September 1, 1970

Inventor(s) Joseph A. Wiese, Jr. and William B. Barte

It is certified that error appears in the above-identified patent and that said Letters Patent are hereby corrected as shown below:

Column 2, line 28, "beam" should be --beams--;

Column 4, line 56, "2,2-dichlorethyl" should be --2,2-dichloroethyl--;

Column 5, line 34, after "methyl" insert --cellulose, polymethyl methacrylate, polyethylene terephthalate, butadiene/styrene/acrylonitrile terpolymers,--;

Column 11, line 22, end of Table II, Footnote No. 4, "corrected" should be --correlated--.

Signed and sealed this 21st day of March 1972.

(SEAL)
Attest:

EDWARD M. FLETCHER, JR.
Attesting Officer

ROBERT GOTTSCHALK
Commissioner of Patents

FORM PO-1050 (10-69)

USCOMM-DC 60376-P69
★ U.S. GOVERNMENT PRINTING OFFICE : 1969 O—366-334